2,937,081

DEFOLIATING CROP-BEARING PLANTS WITH ELEMENTAL IODINE

John H. Nolan, St. Louis, Mo.

No Drawing. Application July 11, 1956
Serial No. 597,076

3 Claims. (Cl. 71—2.2)

This invention relates to improvements in the method of defoliating deciduous plants, and more particularly to compositions which provide an effective premature dropping of leaves by growing plants.

It is well known that certain chemical compounds have the ability to defoliate plants. Although many compounds are sold for this purpose and are used to remove leaves which interfere with the harvesting of certain crops, particularly cotton and beans, they do not always provide a completely satisfactory result. Accordingly, the need for more effective defoliating agents is present and such a compound would provide a substantial improvement in the agricultural art.

The principal purpose of this invention is to provide a novel method for prematurely removing leaves from plants. A further purpose of this invention is to provide compositions, which will defoliate plants more effectively than compounds heretofore available. Further purposes of this invention will be evident from the following description of the invention.

The theory of defoliation is well known. Deciduous plants, both annuals and perennials have at the base of their leaves a layer of cells known as abscission cells, which in the normal metabolic process become enlarged and weakly bonded, whereby a fission between cell layers results enabling the leaf to become severed from the plant. This procedure may take place normally in the case of perennials at the end of the growing season, when the plant is becoming dormant, or it may take place in exceedingly dry weather when insufficient moisture is available to enable the proper function of the entire leaf area of the plant. The artificial defoliation of plants may be effected by applying suitable compounds to the leaves which either directly or indirectly induce the normal growth of the abscission cells. The defoliation of plants is not a herbicidal action, and the dropping of the leaves, even where 100 percent defoliation is effected, does not destroy the plant, the fruit continuing to grow and ripen after the defoliation has taken place.

The need for or desirability of defoliation with respect to certain crops is well recognized. The laborious hand-picking of the bolls represents a substantial cost in the production of cotton. Although many machines have been constructed for picking cotton, the desired result is often not satisfactory because of interference by the leaves. The machines for picking cotton will often remove leaves and the crushing of the leaves in the normal operation of the machine will frequently stain cotton so as to down-grade the product, or at least require a hand-sorting operation to remove leaves and to separate the stained cotton bolls. Because of the access by the sun, the cotton will be completely dry when harvested, and a more efficient operation of the picking machines will be enabled.

The defoliation is also useful in the harvesting of beans. Through the use of defoliants soy beans and other beans conventionally harvested in dry form may be machine picked to recover a high yield of simultaneously ripened seeds without the usual interference of leaves. Other crops, the harvesting of which utilizes presently available defoliants, may be effectively treated by the novel method herein described.

It has been discovered that elemental iodine is useful in prematurely defoliating plants. The elemental iodine may be used in a suitable solvent, for example water, alcohol, glycols, ketones or hydrocarbons. If the slight solubility in some solvents will not permit the concentration of iodine desired, solid dispersions in the liquid medium may be used. Of most importance are the dispersions of iodine in water where solubility may be enhanced by the presence of a better solvent, and the stability of the dispersion perfected by a suitable dispersing or emulsifying agent. These and other methods of formulating the defoliants are described more fully hereinafter.

In the practice of this invention formulations of the elemental iodine are prepared and contacted with the leaves of the plant which is to be defoliated. It has been found that the quantity applied to the plant may vary to some extent being dependent upon the leaf area and the physical properties of the leaf surface. In general this will be approximately 0.1 to 20 pounds per acre, and preferably from 0.5 to 5 pounds per acre. Useful solutions and formulations are those which contain from 0.05 to 5 percent of the active ingredient, but greater concentrations or more dilute concentrations may be used depending upon the ability of the foliage to retain the formulation. It will be apparent that the concentrations which give the optimum result at lowest minimum cost are those which reach the drip point or runoff point when the amount depoisted on the leaf is the known quantity required to produce 100 percent, or the desired extent of defoliation. Obviously this will depend upon the wettability or adhesive properties of the leaf, and the ability of the leaf surface to retain the maximum quantity prior to saturation.

In some cases the physical nature of the leaf surface is such as to make aqueous liquid spray operations unfeasible. In such cases dry pulverulent formulations may be used. This type of application generally requires formulation with suitable pulverulent materials which include the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight of the formulation applied to the plant. Here again the precise proportion to be used will depend upon the quantity of active component which will be retained on the leaf surface so as to provide an amount which will produce the optimum result. It has been found that the formulation must be such as to leave in contact with the leaf surface the quantity of elemental iodine required to produce 100 percent defoliation or the extent of defoliation required or desired.

It has also been found that defoliant formulations may include other aids or conditioning agents for producing maximum efficiency. These include wetting or dispersing agents, agents for adhering the active component to the leaf surfaces and aids for changing the physical characteristics of the leaf structure.

The conditioning agents which produce a wetting or dispersing agent may be used in both solid or liquid formulations. These include conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

Either the solid or the liquid formulations may include small quantities of natural or artificial polymers which may become viscous with the evaporation of the formulation of the vehicle or which in the case of solid compositions may become viscous liquids by hygroscopic action or by partial solution in water subsequently sprayed on the surface or by natural rainfall. Suitable agents of this type are the natural gums, for example gum arabic, gum tragacanth or gum acacia or they may be synthetic polymers such as carboxymethyl cellulose, alginic acid or salts, polyvinyl alcohol or the wholly synthetic polymers such as hydrolyzed polyacrylonitrile, any polymers of vinyl acetate and maleic anhydride or any of the other well known polymeric polyelectrolytes.

The solid formulations may be applied in the form of dust or they may be dispersed in a liquid vehicle, for example water in which they may be completely soluble or partially soluble but dispersed through the action of surface active components of the formulation. In many cases the water soluble components may have their solubility inhibited by the presence of known solvents, in which case the aqueous formulation may exist as an emulsion, either soil in water or water in soil depending upon the quantity of hydrophilic or hydrophobic liquid vehicle present. In general the nature of formulation is believed to be within the province of one skilled in the art.

Further details of the practice of this invention are set forth with respect to the following specific examples.

*Example 1*

A defoliant formulation was prepared using one part by weight of elemental iodine, ten parts of polyoxyethylene sorbitan monolaurate and 89 parts of water. The formulation was sprayed on bean plants at varying levels of application and the extent of defoliation observed as follows:

| Pounds per acre: | Percent defoliation |
| --- | --- |
| 20 | 100 |
| 6 | 100 |
| 2 | 90 |

*Example 2*

The procedure of Example 1 was repeated except that a formulation of one part of iodine, ten parts of an ethylene oxide condensate with fatty acids derived from tall oil, and 89 parts of water. The defoliation observed was as follows:

| Pounds per acre: | Percent defoliation |
| --- | --- |
| 20 | 100 |
| 6 | 100 |
| 2 | 100 |

*Example 3*

A formulation of one part by weight of iodine, 59 parts of polyethylene glycol and 40 parts of water was sprayed on bean plants. Defoliation was observed as follows:

| Pounds per acre: | Percent defoliation |
| --- | --- |
| 20 | 100 |
| 6 | 90 |
| 2 | 100 |
| 1 | 95 |
| 0.5 | 90 |

*Example 4*

A formulation of one part by weight of iodine, 98 parts of acetone and one part of an emulsifier consisting of 35 percent butylamine dodecyl benzene sulfonate and 65 percent of an ethylene oxide condensate with tall oil fatty acids was sprayed on bean plants. The following defoliation was observed:

| Pounds per acre: | Percent defoliation |
| --- | --- |
| 20 | 100 |
| 6 | 100 |
| 2 | 100 |
| 1 | 90 |

*Example 5*

A formulation of one part by weight of iodine, one part of an emulsifier consisting of mahogany soap and sodium dodecyl benzene sulfonate, 100 parts of acetone and 89 parts of water was sprayed on beans. The following defoliation was observed:

| Pounds per acre: | Percent defoliation |
| --- | --- |
| 20 | 100 |
| 6 | 100 |
| 2 | 100 |
| 1 | 95 |
| 0.2 | 90 |

What is claimed is:

1. The method of defoliating crop-bearing plants which comprises applying elemental iodine in an amount sufficient to induce substantial defoliation to the leaves of a plant having a crop at least nearing maturity.

2. The method of defoliation crop-bearing plants which comprises applying from 0.1 to 20 pounds per acre of iodine to the leaves of a plant having a crop at least nearing maturity.

3. The method of defoliating cotton plants having cotton bolls which are at least nearing maturity which comprises applying to the leaves of said plants a liquid dispersion of iodine in the amount of about 2 to 10 pounds per acre of plants and said liquid dispersion being applied at the rate of about 5 to 20 gallons of solution per acre of plants, said liquid dispersion being chemically inert to iodine and non-phytotoxic.

References Cited in the file of this patent

UNITED STATES PATENTS

| 2,280,451 | Riddle | Apr. 21, 1942 |
| 2,726,149 | Boyd | Dec. 6, 1955 |

OTHER REFERENCES

Stoklasa, in "Chemical Abstracts," vol. 21, column 2918(2), 1927.

Newton et al., in "Chemical Abstracts," vol. 47, col. 3503(i) to 3504(a), 1953.

D'Amato, in "Chemical Abstracts," vol. 43, col. 9171(a), 1949.